United States Patent [19]

Soehngen

[11] 4,255,376

[45] Mar. 10, 1981

[54] SOLVENT STRETCH PROCESS FOR PREPARING MICROPOROUS FILMS FROM PRECURSOR FILMS OF CONTROLLED CRYSTALLINE STRUCTURE

[75] Inventor: John W. Soehngen, Berkeley Heights, N.J.

[73] Assignee: Celanese Corporation, New York, N.Y.

[21] Appl. No.: 44,805

[22] Filed: Jun. 1, 1979

[51] Int. Cl.[3] .................... B29C 11/00; B29C 27/10
[52] U.S. Cl. ................................ 264/145; 264/154; 264/288.8; 264/289.3; 264/DIG. 47
[58] Field of Search ............... 264/DIG. 47, 145, 154, 264/288.8, 289.3

[56] References Cited

U.S. PATENT DOCUMENTS

| | | | |
|---|---|---|---|
| 3,738,904 | 6/1973 | Ikeda et al. | 428/155 |
| 3,839,240 | 10/1974 | Zimmerman | 521/143 |
| 3,839,516 | 10/1974 | Williams et al. | 521/62 |
| 3,862,030 | 1/1975 | Goldberg | 521/64 |
| 3,903,324 | 9/1975 | Gukelberger et al. | 427/88 |

*Primary Examiner*—Maurice J. Welsh
*Attorney, Agent, or Firm*—Kenneth A. Genoni

[57] ABSTRACT

Microporous films having improved morphological structure are prepared by the "solvent stretch" method from an olefinic precursor film having a controlled crystalline structure. The crystalline structure of the precursor film is controlled by preparing said film from an olefinic crystalline homopolymer characterized as having a melt index of about 3 to about 20 in the absence of a nucleating agent and a molecular weight distribution ratio of about 3.8 to about 13. In another embodiment the crystalline structure of the precursor film is controlled by incorporating a nucleating agent into the crystalline polymer resin from which the precursor film is prepared which thereby permits a reduction in the melt index of the polymer to about 0.3.

19 Claims, 10 Drawing Figures

FIG. 5
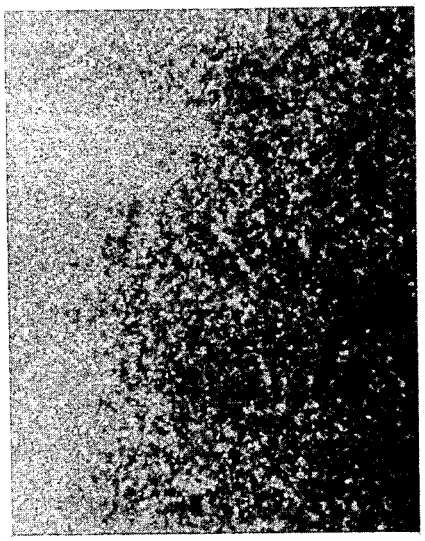
FIG. 6
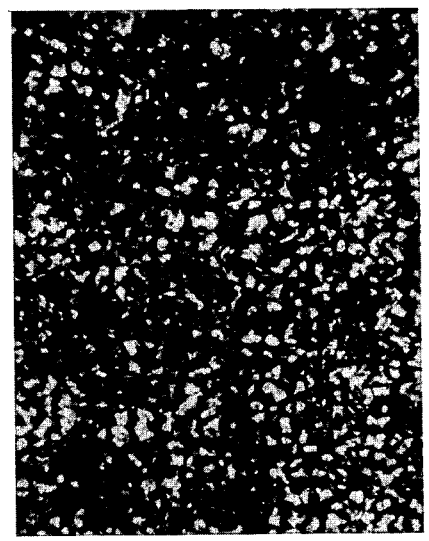
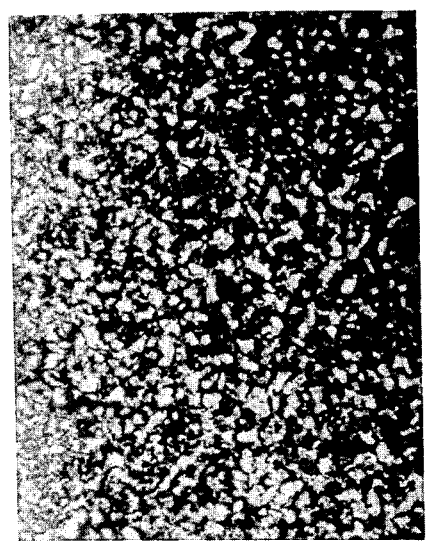
FIG. 7
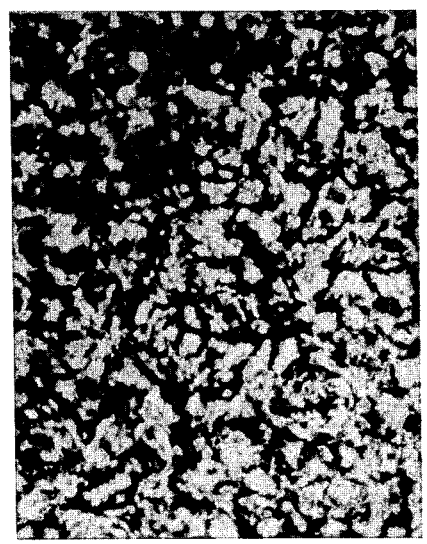
FIG. 8

SOLVENT STRETCH PROCESS FOR PREPARING MICROPOROUS FILMS FROM PRECURSOR FILMS OF CONTROLLED CRYSTALLINE STRUCTURE

BACKGROUND OF THE INVENTION

1. Field of the Invention

The present invention relates to the preparation of microporous films. More particularly, the present invention relates to an improved "solvent stretch" process and a microporous film product having an improved morphological structure.

2. Summary of the Prior Art

A process for preparing microporous films is disclosed in U.S. Pat. No. 3,839,516 which is herein incorporated by reference. This process, hereinafter referred to as the "solvent stretch" process, includes the consecutive steps of (1) contacting a polymeric precursor film having at least two components, one of which is lesser in volume than all the other components (e.g., an amorphous component and a crystalline component), with a swelling agent for sufficient time to permit absorption of the swelling agent into the component of lesser volume, (2) then stretching the precursor film in at least one direction while in contact with the swelling agent, and (3) maintaining said film in its stretched state during removal of the swelling agent. The microporous films themselves are optionally stabilized by heat setting or ionizing radiation. The precursor films from which the microporous films are prepared in accordance with this process are characterized as having a percent of crystallinity of at least 30 percent, preferably at least 40 percent, and most preferably at least 50 percent (e.g., 60 to 90% or higher) and a film thickness of about 0.1 to about 250 mils or thicker.

At one time it has been preferred to employ a particular starting polyethylene resin, Fortiflex A-60-500 resin manufactured by Soltex Polymer Corp., for use in the "solvent stretch" process since it had been found that this particular resin yielded microporous films having enhanced permeability and porosity. However, the reasons that this resin functioned in the "solvent stretch" process better than certain other resins, even certain other polyethylene resins, were not understood. Since that time, the A-60-500 resin has been discontinued for production and is no longer available on the market. Consequently, a search was instituted to uncover a starting resin which could match or better the performance of the discontinued resin. This search was complicated by the lack of understanding by those skilled in the art as to what particular polymer properties were most influential in improving and controlling the properties of a microporous film prepared therefrom.

The above-described patent which discloses the basic "solvent stretch" process contains a broad list of possible starting polymers for the production of microporous films.

For example, the polymers which may be utilized to prepare the precursor film for use in the solvent stretch process are disclosed as including olefinic homopolymers, copolymers, as well as numerous other types of polymers. These polymers such as, for example, polypropylene, are further characterized as possessing a broad melt index of from about 0.1 to about 75, and preferably from about 0.5 to 30, and a weight average molecular weight ranging from about 50,000 to 750,000 and preferably from about 200,000 to 500,000. This patent neither specifically characterizes molecular weight distribution ratio ($\overline{M}_w/\overline{M}_n$) nor density as criteria for selecting a particular polymer from the broadly disclosed classes of polymers. Example 1 thereof does disclose that the polyethylene resin has a particular $\overline{M}_w$ and a particular $\overline{M}_n$ (from which the molecular weight distribution ratio may be calculated to be 14.5).

It is also known to utilize a resin having a high melt index and low molecular weight to provide a precursor film utilized in a "dry stretch" process to prepare a microporous film as evidenced by U.S. Pat. No. 3,839,240, and it is further known to incorporate organic and inorganic fillers into porous films prepared by a variety of methods as evidenced by U.S. Pat. Nos. 3,903,324; 3,862,030; and 3,738,904. However, such methods do not employ a "solvent stretch" process and are therefore not directed toward solving the particular problems associated therewith.

There has been a continuing search for methods to improve the morphological structure of microporous films prepared by the "solvent stretch" process.

It is therefore an object of the present invention to provide an improved "solvent stretch" process for preparing a microporous film having an improved morphological structure.

These and other objects, as well as the scope, nature and utilization of the present invention will be apparent to those skilled in the art from the following detailed description and appended claims.

SUMMARY OF THE INVENTION

In one aspect of the present invention there is provided an improved "solvent stretch" process for preparing an open-celled microporous polymeric film from a non-porous polymeric percursor film comprising a crystalline polymer having both an amorphous and a crystalline component. The improvement comprises utilizing an olefinic homopolymer having (1) a molecular weight distribution ratio of about 3.8 to about 12, (2) optionally, a nucleating agent incorporated therein in an amount of from about 0.01 to about 10% by weight of the polymer, and (3) a melt index of about 3 to about 13, when a nucleating agent is not employed, and from about 0.3 to about 13 when a nucleating agent is employed, to prepare a precursor film having a spherulite size and an orientation sufficient to provide a resulting microporous film having an improved morphological structure.

The resulting microporous film has an improved morphological structure relative to corresponding microporous films prepared from polymers having no nucleating agent and/or having molecular weight distribution ratios, and melt indices outside the ranges of the present invention and under a given set of "solvent stretch" conditions.

In another aspect of the present invention there is provided an improvement in a "solvent stretch" process for preparing an open-celled microporous polymeric film from a non-porous polymeric precursor film being composed of a crystalline polymer having both an amorphous and a crystalline component. The improvement comprises incorporating a nucleating agent into a crystalline olefinic homopolymer in an amount at from about 0.01 to about 10% by weight of the polymer to obtain a precurser film having a smaller spherulite since relative to a precursor film prepared from a polymer which lacks a nucleating agent, under a given set of processing conditions.

BRIEF DESCRIPTION OF THE DRAWINGS

FIGS. 1 through 10 are photographs taken at various powers of magnification using an optical microscope and a polarized light source, of polyethylene microporous films prepared by the "solvent stretch" process.

DESCRIPTION OF THE PREFERRED EMBODIMENTS

Figure 1:
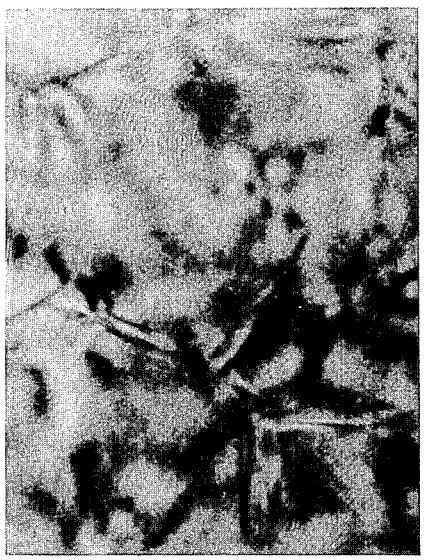
Figure 2:
Figure 3:
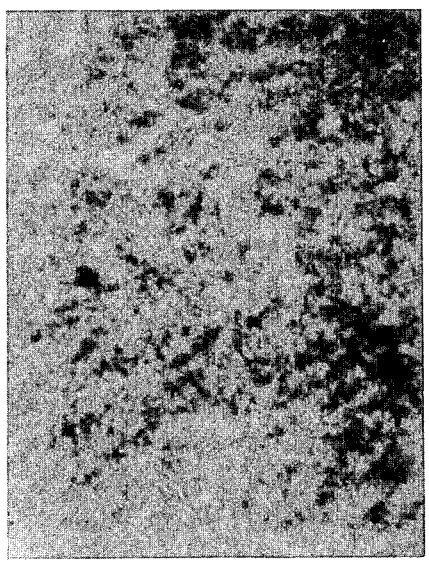
Figure 4:
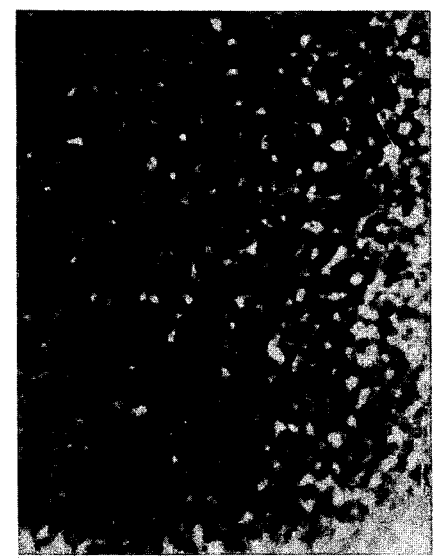

The present invention relates to a process for improving the morphological structure of a microporous film prepared from a precursor film of certain defined characteristics by the "solvent stretch" method as defined herein. A microporous film of improved morphological structure prepared in accordance with the "solvent stretch" method is one which is characterized as having at least one of the properties of porosity, permeability and film thickness enhanced.

It has been found that these enhanced properties may be achieved by controlling the initial crystalline structure of the precursor film utilized in the "solvent stretch" process.

One advantage of controlling the crystalline structure of the precursor films described herein in the manner described is that it is possible to increase the rate of production (e.g., increase strain rate) of the microporous film prepared therefrom while still achieving films having acceptable porosity and permeability. Thus, by controlling the crystalline structure of the precursor film employed in the solvent stretch process, such precursor films become more readily susceptible to the solvent stretching technique and a more efficient process is obtained.

An additional advantage of the present invention is that it permits the use of thicker films. Thick films cool down more slowly and thus can develop large spherulites. Large spherulites cause problems in the solvent stretch process as described herein. Since certain applications require thicker film the present invention provides microporous films of greater versatility.

The parameters which have been found to influence the control of the crystalline structure of the precursor films employed in the "solvent stretch" process in the manner desired include melt index, molecular weight, molecular weight distribution, type of polymer selected, and presence of nucleation sites.

It is known that crystallizing polymers are capable of forming very perfect structures, e.g., unit crystals with regular external faces, as well as less perfect structural forms referred to as spherulites. The fundamental building blocks of each of these structures are arrays of folded polymer chains called lamella. In the more perfect structures, which typically can be formed when the polymers are crystallized under high axial stress, such as in the simple extrusion of thin films, the lamella are aligned in rows parallel to the direction of stress. In these rows the surface planes of the lamella are perpendicular to the direction of stress. This type of morphology is referred to herein as a row nucleated structure or row lamella structure and is considered a highly oriented structure. These lamella are interconnected by short fabrils which create web-like interlamella linkages between the planar surfaces of the lamella.

Spherulites, on the other hand, are crystalline structures wherein the lamella are arranged in a radial fashion around a central axis like spokes on a wheel. Spherulites can vary in size and may be quite large, e.g., up to several millimeters in diameter. In most cases, they are visible under an optical microscope. Films which possess an increasingly larger number of spherulites are characterized as possessing decreasingly lower orientation.

It is believed that it is the spherulitic crystal structures of the precursor films which respond to the "solvent stretching" process under conditions of low stress to yield microporous films. Consequently, the greater the number of relatively small spherulites which a precursor film possesses, the higher will be the permeability of the microporous film. Conversely, the greater the predominance of the row nucleated structure in the precursor film, the greater the reduction in permeability of the resulting solvent stretched microporous film since this type of structure does not appear to respond to the "solvent stretching" process to form a permeable film.

At the same time, the formation of large spherulites in the precursor film tends to reduce the total number of spherulites therein and increases the probability that the precursor film will split when "solvent stretched".

It has been found that by controlling the melt index of the polymer employed to prepare the precursor film, the crystalline structure which develops therein can be made to favor the spherulitic type rather than the row nucleated type and the size of the spherulites can be kept small.

A film having a "small spherulite size" is herein defined to have spherulites having an average diameter of from about 0.5 to about 10, preferably from about 0.5 to about 8, and most preferably from about 0.5 to about 2 microns ($\mu$).

Spherulite size is determined optically by scaling the spherulite seen under an optical microscopic field.

Accordingly, it has been found that the crystalline structure of the precursor film may be substantially controlled and improved by utilizing a crystalline olefinic polymer, having a melt index of not less than about 3 and typically from about 3 to about 20, preferably from about 3 to about 15 (e.g., 5 to about 13), and most preferably from about 3 to about 8 to yield a precursor film having a small spherulite size.

An olefinic polymer having a melt index increasingly lower than about 3 yields a precursor film of increasingly higher molecular weight with increasingly larger spherulites which are detrimental to film processability.

It is to be understood that there are, inter-alia, two competing requirements which operate in selecting a polymer for use in the present invention, namely, a mechanical requirement and a structural requirement.

The mechanical requirement can be characterized as a limitation on the minimum melt strength or melt viscosity which a polymer must possess in order to form a stable film. For example, polymers having increasingly higher molecular weights (i.e., decreasingly lower melt indices) are more readily processed into thicker films by either the blown film method or slit die extrusion method since they possess higher melt viscosities.

In contrast, it has been found that polymers having increasingly higher melt indices (i.e., decreasingly lower molecular weights) are more conducive for use in the "solvent stretch" process to form films of higher permeability.

Consequently, placing limits on the minimum melt index which a polymer can possess automatically limits the thickness of a film prepared therefrom. The extent of this limitation varies depending on the particular method employed to prepare the precursor film.

Thus, precursor films having a melt index increasingly greater than about 8 are increasingly more difficult to prepare using blown film extrusion methods, particularly at a film thickness greater than about 8 mils.

When slit die extrusion methods are employed, relatively stable films having a thickness of about 8 mils are obtainable even though the polymer employed therein may possess a melt index as high as 20 and possibly in some instances as high as 30.

In short, the lower limit of the melt index of the polymers employed in the "solvent stretch" process is determined by the structural requirement described herein and the upper limit is determined by the mechanical requirement.

In a preferred embodiment, a polymer having a melt index of from about 3 to about 8 is particularly preferred to be used to prepare a precursor film having a film thickness of from about 1 to about 8 mils.

The term melt index as used herein is defined as the value obtained by performing ASTM D-1238 under conditions of temperature, applied load, timing interval and other operative variables which are specified therein for the particular polymer being tested.

An alternative way to characterize the polymers utilized in the present invention instead of in terms of melt index is by molecular weight. Thus, the polymers of the present invention should possess a weight average molecular weight of about 40,000 to about 150,000, preferably from about 50,000 to about 100,000 and most preferably from about 60,000 to about 80,000.

The preferred precursor film employed in preparing the microporous films by the "solvent stretch" method having the improved properties disclosed herein are those prepared utilizing polyethylenes and specifically polyethylene having melt indices and molecular weights set out above.

It has also been found that certain resins are prone to develop large spherulites in the precursor film due to lack of nucleation sites and low crystallization rates. Precursor films with large spherulites have been found to be difficult to process (i.e., splits develop in the film during stretching) successfully in a continuous "solvent stretch" process, particularly at the low strain rates (e.g., 25%/min.) which would provide adequate contact time in the swelling agent for maximum permeability development. Strain rate is the percent stretch per minute which the precursor film undergoes during "solvent stretching". Therefore, to improve the number of nucleation sites, and thereby reduce spherulite size, nucleating agents can be added to the film forming crystalline polymers prior to formation of the precursor film.

Suitable nucleating agents should be non-reactive with the polymer resin at processing conditions and have high surface area, small particle size and be capable of being dispersed in the polymer matrix. Moreover, such agents should not be agglomerated for maximum effect to be achieved.

Representative examples of suitable nucleating agents include silica, diatomaceous earth, titanium dioxide, clays, salts of mono and di carboxylic acids, colloidal polytetrafluoroethylene, i.e., polytetrafluoroethylene having a colloidal particle size of about 0.5 to 1.0 $\mu$ and capable of being dispersed in the colloidal state and mixtures thereof.

The nucleating agent may also be a polyethylene resin having a low melt index of from about 0.1 to about 3, typically from about 0.4 to about 1, and a narrow molecular weight distribution ratio of from about 1 to about 3.5. Such a polymer would have a large proportion of molecular weight fractions in the range of about 150,000 to about 200,000. Consequently, these high molecular weight fractions would be the first to solidify upon cooling and are believed to provide nucleation sites for the formation of small spherulites. Since a polyethylene nucleating agent is employed in small amounts it results in an overall balance of polymer blend properties which are beneficial to the formation of microporous films of improved crystalline structure.

By utilizing these nucleating agents it is possible to reduce the size of otherwise large spherulites of a precursor film to a "small spherulite size" as herein defined and thereby permit process conditions to be used which improve permeability of the microporous film prepared from the precursor film.

Moreover, when a nucleating agent is employed, it is possible to employ a polymer resin having a melt index as low as 0.3 (e.g., 0.3 to 20), typically from about 1 to about 3, due to the compensating effect of such agents on precursor film spherulite size. However, for maximum improvement in crystalline structure, high melt indices as described herein are preferred.

Although the nucleating agents may be present in the polymer in any amount which is effective to reduce spherulite size, it is preferred that such amount constitute from about 0.01 to about 10%, preferably from about 0.01 to about 1.0%, and most preferably from about 0.01 to about 0.5% by weight based on the weight of the polymer.

The nucleating agents are incorporated and dispersed within the polymer resin by conventional means such as blending them with resin pellets and subsequently melt extruding the mixture under high shear conditions.

Alternatively, the polymer may be dissolved in a suitable solvent and the nucleating agent dispersed in the solution. The polymer and nucleating agent are then coprecipitated by flashing off the solvent or by the addition of a non-solvent. The co-precipitate would then be filtered and dried.

It has also been found that the use of olefinic copolymers or olefinic polymers having a narrow molecular weight distribution ratio yield precursor films and microporous films prepared therefrom of decreasingly lower crystallinity (e.g., about 50 to about 60%) and decreasingly reduced permeability.

Accordingly, to control the crystalline structure of the precursor films and thereby improve the morphological structure of the resulting microporous films by increasing their crystallinity, it is preferred to utilize homopolymers having increasingly higher densities and a broad molecular weight distribution ratio.

The degree of crystallinity of a polymer is reflected by the density of the polymer. Thus, polymers which are prepared using increasingly higher amounts of co-monomers exhibit decreasingly lower densities as a result of the random arrangement of the co-monomers in the polymer chain and chain branching, both of which in turn reduce the crystallinity of the polymer and a precursor film subsequently prepared therefrom. It has been found that the use of homopolymers rather than co-polymers to prepare the precursor film substantially improves the morphological structure of the microporous film prepared therefrom. When polyethylene is employed as the polymer used to prepare the precursor film the density thereof should not be less than about 0.960 gm/cc and preferably from about 0.960 to about 0.965 gm/cc (e.g., 0.962 to about 0.965 gm/cc). This density range is indicative of polyethylene homopolymers. The term density as used herein is defined as the value in gm/cc obtained by performing ASTMD-1505 on a particular polymer. Although all polyethylene polymers having a density of at least 0.960 gm/cc are homopolymers, the nature of any given resin when tested under standardized conditions as described above can yield densities greater than 0.960 gm/cc. The reasons for the variation in the density of the homopolymers is believed to result from limited chain branching which can occur during polymer formation. Thus, the lower the degree of chain branching the higher will be the density of the homopolymer. It has also been found that further improvements in the morphological structure of microporous films can be achieved by employing homopolymers having a density as high as technically possible which in the case of polyethylene is about 0.965 gm/cc.

The molecular weight distribution ratio of a polymer is determined by dividing the weight average molecular weight ($\overline{M}_w$) by the number average molecular weight ($\overline{M}_n$) of a given sample.

$\overline{M}_w$ can be determined by gel permeation chromotography using o-dichlorobenzene at 145° C. which is further discussed in J. F. Johnson and B. S. Porter, eds., "Analytical Gel Permeation Chromotography", Wiley-Interscience, N.Y. (1968). $\overline{M}_n$ can be determined by end group analysis as described in 9 Encyclopedia of Polymer Science and Technology 184, Interscience Publishers (1967). Both of the above references are herein incorporated by reference.

Polymers having a broad molecular weight distribution ratio may be characterized as having a molecular weight distribution ratio of not less than about 3.8, typically from about 3.8 to about 13 (e.g., about 4 to about 12), preferably from about 6 to about 12, and most preferably from about 8 to about 12 (e.g., 10). A molecular weight distribution ratio of below about 3.8 is considered to be narrow.

If the molecular weight distribution ratio of the polymer is increasingly greater than about 13, the resulting precursor film is believed to be increasingly less crystalline and exhibits increasingly slower crystallization rates. Slower crystallization rates lead to the formation of larger spherulites which, as described herein, is detrimental to precursor film processability. On the other hand, if the molecular weight distribution ratio is too narrow and the polymer possesses a preponderance of high molecular weight fractions, there is a greater possibility of polymer chain entanglement which in turn gives rise to slower crystallization rates and the problems associated therewith.

In general, the "solvent stretch" process utilizes a precursor film which must contain at least two components, e.g., an amorphous component and a crystalline component. This process requires only that one of the components be mobilized (softened) by a swelling agent after which stretching and drying under tension is accompanied by the formation of micropores.

A significant group of polymers to which this invention may be applied are the olefinic homopolymers. An "olefinic homopolymer" (or olefin homopolymer) is herein defined to be a polymer prepared by polymerizing an olefin monomer through its unsaturation and includes such polymers as polyethylene, polypropylene, poly-3-methyl butene-1, poly-4-methyl pentene-1, poly-1-butene, poly-1-pentene, poly-4-methyl-1 pentene, poly-4,4-dimethyl-1-pentene, poly-4-methyl-1-hexene, poly-3-methyl-1-hexene, poly-5-methyl-1-hexene, poly-4,4-dimethyl-1-hexene, poly-5-methyl-1-heptene, poly-1-decene, poly-1-dodecene, poly-1-tetradecene, poly-1-hexadecene, poly-1-octadecene and mixtures thereof.

Mixtures of polymers may be employed to give the overall blend of the properties described herein.

These polymers in the form of a precursor film will generally have a percent crystallinity of about 60 to about 85%, typically from about 65 to about 85% and preferably from about 70 to about 85%.

While the present disclosure and examples are directed to the aforesaid olefinic homopolymers the invention also contemplates application of the principles discussed herein in selecting the polymer used to prepare the precursor film to the high molecular weight acetal, e.g., oxymethylene homopolymers.

Other relatively crystalline polymers to which the invention should be applicable are the polyalkylene sulfides such as polymethylene sulfide and polyethylene sulfide, the polyarylene oxides such as polyphenylene oxide, the polyamides such as polyhexamethylene adipamide (nylon 66) and polycaprolactam (nylon 6), and polyesters such as polyethylene terephthalate.

As described above the microporous films prepared by the "solvent stretch" method under a given set of solvent stretching conditions and in accordance with this invention are characterized by improved permeability, porosity, processability and film thickness.

The permeability of the microporous films of the present invention is determined by the Gurley test, i.e., according to ASTM D 726 by mounting a film having an area of one square inch in a standard Gurley densometer. The film is subject to a standard differential pressure (the pressure drop across the film) of 12.2 inches of water. The time in seconds required to pass 10 cm$^3$ of air through the film is expressed in Gurley seconds and is an indication of film permeability.

The microporous films prepared in accordance with the present invention (at a standard thickness of 2 mils) have Gurley values of about 0.2 to about 10, preferably from about 0.2 to about 5, and most preferably from about 0.2 to about 3 seconds. These values also give an indication of porosity with the higher values indicating lower levels of permeability.

The porosity of the microporous film of the present invention may be defined as a percent ratio of the total volume occupied by the void space of a standard sample of microporous film to the bulk volume of the same sample which is the sum of the void space volume and the volume occupied by the solid material of the film itself. Percent porosity is determined by measuring the thickness, length and width of a microporous film sample to determine the film's bulk volume. The film sample is then weighed and the density of the film sample is determined. The density of the polymer resin is then determined. The percent porosity is then calculated from the equation.

$$\% \text{ Porosity} = \left(1 - \frac{\text{Density of Film Sample}}{\text{Density of Resin}}\right) \times 100$$

The porosity of the microporous films prepared in accordance with the present invention may vary from about 30 to about 80, preferably from about 50 to about 80, and most preferably from about 60 to about 80 percent.

The thickness of the resulting microporous film will vary depending upon the extrusion method utilized to prepare the precursor film and the desired properties sought to be imparted to the microporous film. Thus, where blown film extrusion methods are utilized and without regard to structural requirements, precursor films of about 0.5 to about 15 mils, preferably from about 0.5 to about 10 mils, and most preferably from about 3 to about 8 mils thickness are obtainable. Similarly, without regard to structural requirements where slit die extrusion methods are utilized, precursor films of about 1 to about 30 mils, preferably from about 5 to about 28 mils, and most preferably from about 10 to about 20 mils thickness are obtainable. As described herein, under a given set of "solvent stretching" conditions, thicker precursor films prepared from polymers which possess the properties described herein may be employed to achieve the same permeabilities as thinner precursor films which do not, subject to the considerations (i.e., mechanical requirements) described herein.

The microporous films of the present invention, in a tensionless state, have a lowered bulk density compared with the density of corresponding polymer materials having no open-celled structure, e.g., those from which it is formed. Thus, the films have a bulk density no greater than about 70 percent and preferably 20 to 40 percent of the precursor film. Stated another way, the bulk density is reduced by at least 30 percent and preferably 60 to 80 percent. For polyethylene, the reduction is 30 to 80 percent, preferably 60 to 80 percent. The bulk density is also a measure of porosity, that is, where the bulk density is about 20 to 40 percent of the starting material, the porosity has been increased by 60 to 80 percent because of the pores or holes.

The final crystallinity of the microporous film is preferably at least 60 percent, more preferably at least 65 percent, and more suitably about 70 to 85 percent, as determined by the X-ray method described by R. G. Quynn et al in the *Journal of Applied Polymer Science*, Vol. 2, No. 5, pp. 166-173. For a detailed discussion of crystallinity and its significance in polymers, see *Polymers and Resins*, Golding (D. Van Nostrand, 1959).

The microporous films of the present invention may also have an average pore size of 200 to 5000 Å, and more typically 500 to 3000 Å. These values can be determined by mercury porosimetry as described in an article by R. G. Quynn et al, on pages 21-34 of Textile Research Journal, January, 1963 or by the use of electron microscopy as described in Geil's *Polymer Single Crystals*, p. 69 (Interscience 1963). When an electron micrograph is employed pore length and width measurements can be obtained by simply utilizing a ruler to directly measure the length and width of the pores on an electron microscope magnified photograph taken usually at 5,000 to 10,000 magnification. Generally, the pore length values obtainable by electron microscopy are approximately equal to the pore size values obtained by mercury porosimetry.

When the improved microporous films of the present invention are prepared which exhibit the required Gurley values and porosity values, that is, a Gurley value of not greater than about 40 seconds and preferably about 1 to 10 seconds and a bulk density of about 30 to about 50 percent of the bulk density of the corresponding polymer film having no open-celled structure, the resulting films will also be found to have a surface area within certain predictable limits. This surface area value or characteristic is inherent in the films when they also have the Gurley values and reduced bulk density values given above. Thus, in the films of the present invention when Gurley values and bulk density values are as indicated, they will also be found to have a surface area of at least 10 sq.m/gm. and preferably in the range of about 15 to 25 sq.m/gm. For films formed from polyethylene, the surface area generally ranges from about 10 to 25 sq.m/gm., and preferably about 20 sq.m/gm.

Surface area may be determined from nitrogen or krypton gas adsorption isotherms using a method and apparatus described in U.S. Pat. No. 3,262,319. The surface area obtained by this method is usually expressed as square meters per gram.

In order to facilitate comparison of various materials, this value can be multiplied by the bulk density of the material in grams per cc. resulting in a surface area quantity expressed as square meters per cc.

The types of apparatus suitable for forming the precursor films of this invention are well known in the art.

For example, a conventional film extruder equipped with a shallow channel metering screw and coat hanger die is satisfactory. Generally, the resin is introduced into a hopper of the extruder which contains a screw and a jacket fitted with heating elements. The resin is melted and transferred by the screw to the die from which it is extruded through a slot in the form of a film from which it is drawn by a take-up or casting roll. More than one take-up roll in various combinations or stages may be used. The die opening or slot width may be in the range, for example, of about 10 to 200 mils, preferably 40 to 100 mils.

Using this type of apparatus, film may be extruded at a drawdown ratio of about 5:1 to 200:1, preferably 10:1 to 50:1.

The terms "drawdown ratio" or, more simply, "draw ratio", as used herein is the ratio of the film wind-up or take-up speed to the speed of the film issuing at the extrusion die.

The melt temperature for film extrusion is, in general, no higher than about 100° C. above the melting point of the polymer and no lower than about 10° C. above the melting point of the polymer.

For example, polyethylene may be extruded at a melt temperature of about 175° to 225° C., polypropylene may be extruded at a melt temperature of about 180° C. to 270° C., preferably 200° C. to 240° C.

The extrusion operation is preferably carried out with slow cooling in order to minimize stress and any associated orientation which might result from fast quench to obtain maximum crystallinity but yet fast enough to avoid developing large spherulities. This may be accomplished by controlling the distance of the chill roll take-up from the extrusion slot.

While the above description has been directed to slit die extrusion methods, an alternative method of forming the starting films contemplated by this invention is the blown film extrusion method wherein a hopper and an extruder are employed which are substantially the same as in the slit die extruder described above. From the extruder, the melt enters a die from which it is extruded through an annular orifice to form a tubular film having an initial diameter $D_1$. Air enters the system through an inlet into the interior of said tubular film and has the effect of blowing up the diameter of the tubular film to a diameter $D_2$. Means such as air rings may also be provided for directing the air about the exterior of extruded tubular film so as to provide different cooling rates. Means such as a cooling mandrel may be used to cool the interior of the tubular film. After a distance during which the film is allowed to completely cool and harden, it is wound up on a take-up roll.

Optionally, the extruded film may then be initially heat treated or annealed in order to improve crystal structure, e.g., by increasing the size of the crystallites and removing imperfections therein. Generally, this annealing is carried out at a temperature in the range of about 5° C. to 100° C. below the melting point of the polymer for a period of a few seconds to several hours, e.g., 5 seconds to 24 hours, and preferably from about 30 seconds to 2 hours. For polyethylene, the preferred annealing temperature is about 90° to about 100° C.

The precursor film is then subjected to the "solvent stretch" process as described in U.S. Pat. No. 3,839,516.

Thus, the basic "solvent stretch" process as referred to herein upon which the present invention improves may be summarized by the following:
(a) contacting a polymeric non-porous precursor film, comprising a crystalline polymer having both an amorphous and a crystalline component, with a swelling agent, said swelling agent comprising a non-aqueous solvent having a Hildebrand solubility parameter at or near that of the polymeric film, for a time sufficient to permit absorption of the swelling agent into the film;
(b) stretching said precursor film in at least one direction while in contact with the swelling agent; and
(c) removing the swelling agent from the film while maintaining said film in its stretched state.

In accordance with the generally accepted principles of the basic "solvent stretch" process the extruded precursor film, which can be optionally and preferably annealed, is swollen in contact with a swelling agent, preferably immersed therein, and stretched uniaxially while still in contact with the swelling agent. The swelling agent is removed preferably by evaporation, while under tension, and preferably at the same extension.

The above steps can be accomplished by passing the precursor film between a first pair of rolls through the swelling agent and then through a second pair of rolls. The second pair of rolls are rotated at higher peripheral speeds than the first pair of rolls so as to effect stretching of the film to a predetermined extent as described in U.S. Pat. No. 3,838,516.

The swelling agent should be such that it preferentially swells at least one of the minor components of the bicomponent or multicomponent film. For most polymers solvent stretching can be conducted by contact with any one of a number of suitable solvents.

Generally, a solvent having a Hildebrand solubility parameter at or near that of the polymer would have a solubility suitable for the drawing process described herein. The Hildebrand solubility parameter measures the cohesive energy density. Thus, the underlying principle relies on the fact that a solvent with a similar cohesive energy density as a polymer would have a high affinity for that polymer and would be adequate for this process.

General classes of swelling agents from which one appropriate for the particular polymeric film may be chosen are lower aliphatic alcohols such as ethanol, etc.; lower aliphatic ketones such as acetone, methyl ethyl-ketone cyclohexanone; lower aliphatic acid esters such as ethyl formate, butyl acetate, etc.; halogenated hydrocarbons such as carbon tetrachloride, trichloroethylene, perchloroethylene, chlorobenzene, etc.; hydrocarbons such as heptane, cyclohexane, benzene, xylene, tetraline, decaline, etc.; nitrogen-containing organic compounds such as pyridine, formamide, dimethylformamide, etc.; ethers such as methyl ether, ethyl ether, dioxane, etc. A mixture of two or more of these organic solvents may also be used.

The preferred swelling agents for polyethylene include perchloroethylene (BP 127° C.) and trichloroethylene (BP 86° C.).

The present invention is further illustrated by the following examples. All parts and percentages in the examples as well as in the specification and claims are by weight unless otherwise specified.

EXAMPLE 1

Crystalline polyethylene (Soltex resin A60-500) having a melt index of 5.0; a weight average molecular weight of about 80,000, a density of 0.960 gm/cc and a molecular weight distribution ratio of about 9.0 is prepared by the blown film extrusion method to form a precursor film (3 mil thick) and allowed to cool by quenching in air at 25° C. A sample of the resulting precursor film is then immersed for a period of 1 minute in trichloroethylene at 70° C. and subsequently stretched in one direction, while immersed in trichloroethylene maintained at a temperature of 70° C., at a strain rate of 150%/min. to 4 times its initial length (i.e., 300% total stretch). The trichloroethylene is then removed by evaporation and the sample allowed to dry in air in the stretched state. Within a minute the sample becomes opaque which is indicative of micropores. Drying is carried out at 25° C. After drying, permeability measurements are carried out with a Gurley densometer according to ASTM No. D726 and the results shown at Table I run 10. The sample is inserted into the densometer and a one-inch square portion thereof is subject to a pressure of 12.2 inches of water. The time required to pass 10 cm$^3$ of air through the one-inch square portion of the sample is recorded (in seconds) as a measure of permeability. As the number of seconds required to pass the set volume of air increases the permeability decreases.

Another precursor film sample is annealed at 90° C. under tensionless or "free to relax" conditions for one hour, solvent stretched as described above and the permeability of the resulting film is determined.

The Gurley values for those precursor samples which are not annealed prior to stretching are reported at Table I in the column labeled "As-Is" while the Gurley values of those precursor samples which are annealed prior to stretching are reported at Table I in the column labeled "After 1 hr. at 90° C.".

Using the same procedures as described above, several different microporous film samples are prepared from various conventional polyethylene resins, the characteristic properties of which are summarized at Table I.

Runs 1, 2, 3, 4, 5, 6, 9, and 10, respectively, utilize polyethylene resins identified as B45-40R-04, B50-500N, K-50-500(F239), G60-42-25, A60-55R(F304), G60-80-89, K60-500 (F-240), A60-500, all obtained from Soltex Polymer Corp., Houston, Texas.

Runs 7 and 8, respectively, utilize polyethylene resins identified as LB851, and LB861, all available from U.S.I. Chemicals.

similar densities and melt indices. For example a comparison of runs 2 to 3, and runs 9 to 10 evidence this trend.

TABLE I

| Run No. | Supplier | Identification | Density (gm/cc) | Melt Index | Molecular Weight Distribution Ratio (Mw/Mn) | Precursor Gauge(mil) | Microporous Film Permeability, Gurley, Sec. Precursor As Is | Precursor After 1 hr. at 90° C. |
|---|---|---|---|---|---|---|---|---|
| 1 | SOLTEX | B45-40R-04 | 0.945 | 0.4 | 14.6 | 3 | 10,000 | 2100 |
| 2 | SOLTEX | B50-500N | 0.950 | 5.0 | 4.5 | 3 | 3,600 | 245 |
| 3 | SOLTEX | K50-500(F239) | 0.950 | 5.0 | 5.9 | 3 | 900 | 190 |
| 4 | SOLTEX | G60-42-25 | 0.960 | 0.42 | 4.7 | 3 | 85.0 | 45 |
| 5 | SOLTEX | A60-55R(F304) | 0.960 | 0.55 | 15.0 | 3 | 60.0 | 31 |
| 6 | SOLTEX | G60-80-89 | 0.960 | 0.8 | 7.5 | 3 | 95.0 | ND |
| 7 | U.S.I. | LB851 | 0.960 | 1.0 | 6.8 | 3 | 38.6 | 30.2 |
| 8 | U.S.I. | LB861 | 0.960 | 1.8 | 4.7 | 3 | 31.2 | 24.9 |
| *9 | SOLTEX | K60-500(F240) | 0.960 | 5.0 | 3.8 | 3 | 28.0 | 19 |
| *10 | SOLTEX | A60-500 | 0.960 | 5.0 | 9.8 | 3 | 13.0 | 9 |
| *11 | AMOCO | 650F4 | 0.960 | 5.5 | 8.2 | 3 | 34.8 | ND |
| *12 | ARCO | Super Dylan 7080 | 0.962 | 7.0 | 6.0 | 3 | 14.5 | ND |
| *13 | AMOCO | 680B4 | 0.962 | 13.0 | 9.0 | 3 | 8.5 | ND |
| 14 | DOW | XO-3810.20 Exp. | 0.965 | 2.8 | 8.0 | 3 | 28.7 | ND |

*NOTE:
Runs 9, 10, 11, 12, and 13 utilize a resin having a broad weight molecular weight distribution ratio and a melt index of at least 3 and are within the scope of this invention—The remaining runs are included for purposes of comparison
ND = Not Determined Runs 11 and 13 are polyethylene resins identified as 650F4 and b 680B4, both available from Amoco Chemicals Corp.

Run 12 utilizes a polyethylene resin available from ARCO-Polymers Inc. Subsidiaries of Atlantic Richfield Co. identified as Super Dylan 7080.

Run 14 utilizes a polyethylene resin available from Dow Chemical Company and identified as XO-3810.20 Exp.

The results of runs 1 to 14 are set out in Table 1.

Runs 1 to 14 are arranged according to increasing densities first, then by increasing melt index.

As may be seen from the results of Table 1 those polymers with densities below 0.960 yield microporous films of substantially reduced permeability. Moreover, those polymers with densities of at least 0.962 gm/cc generally yield better permeability than those prepared from polymers having a density of 0.960 gm/cc. The lower permeability of run 14 can be attributed to the low melt index of the polymer in comparison with those of runs 12 and 13. The permeability of run 14 would indicate that density has the greatest effect on permeability.

The effect of melt index on permeability can be observed by comparing polymers having similar densities. Thus, for runs 4 to 11 the trend of increasingly higher permeability with higher melt index is generally observed. Only run 11 does not follow this trend. It is believed that this may be attributed to the tendency of this polymer to form large spherulites as discussed in Example 3.

The effect of molecular weight distribution ratio on permeability can be observed by comparing runs with

EXAMPLE 2

This example is run to show the effect of spherulite size on permeability of various polyethylene resins. Thus, several precursor films are prepared by blown and cast methods described herein from the Soltex A60-500 resin having a melt index of 5.0 and a molecular weight distribution ratio of 9.8 and the AMOCO 650F4 resin having a melt index of 5.5 and a molecular weight distribution ratio of 8.2. The structure of these films is then converted to a microporous configuration by the "solvent stretch" method wherein 4" by 4" samples are clamped between the jaws (1" separation) of a movable jaw stretch frame. Each sample is then immersed in trichloroethylene at 70° C. for 1 minute. The sample is then stretched while in contact with the swelling agent at the rate of 150%/min. until a final extension of 300% based on the original length is reached. Each sample is then soaked again in trichloroethylene at 70° C. for 1 minute while in the stretched state, removed, and allowed to air dry at 25° C. at constant length. The spherulite size and permeability of each sample is then determined. Permeability is tested in accordance with the test outlined in Example 1 on the Gurley densometer. Spherulite size (diameter) is determined by optical scaling using an optical microscope. The value reported is an average value. Visual observations are also noted for each film sample.

The results of these tests are set out in Table II as runs 1 to 15. As may be seen therefrom, there is a direct correlation between spherulite size and permeability, i.e., the smaller the spherulite size the better the permeability.

TABLE II

| | | | EFFECT OF SPHERULITE SIZE | | | | |
|---|---|---|---|---|---|---|---|
| | | | Film | | Batch Stretch Test | | |
| Run No. | Resin | Film Process | Thickness (mil) | Spherulite size (μ) | Strain Rate %/min. | Gurley, sec. | Comment |
| 1 | A60-500 | Blown | 2½ | 5-7 | 37.5 | 1.01 | O.K. |
| 2 | A60-500 | Blown | 2½ | 5-7 | 30 | 0.79 | O.K. |
| 3 | A60-500 | Blown | 2½ | 5-7 | 25 | 0.73 | O.K. |
| 4 | AMOCO 650F4 | Blown | 2½ | 12-16 | 150 | 3.7 | O.K. |
| 5 | AMOCO 650F4 | Blown | 2½ | 12-16 | 60 | 1.5 | O.K. |

TABLE II-continued

EFFECT OF SPHERULITE SIZE

| Run No. | Resin | Film Process | Film Thickness (mil) | Spherulite size (μ) | Strain Rate %/min. | Batch Stretch Test Gurley, sec. | Comment |
|---|---|---|---|---|---|---|---|
| 6 | AMOCO 650F4 | Blown | 2½ | 12–16 | 50 | 0.87 | Pinholes |
| 7 | AMOCO 650F4 | Blown | 2½ | 12–16 | 43 | ND | Broke |
| 8 | AMOCO 650F4 | Blown | 2½ | 12–16 | 37.5 | ND | Broke |
| 9 | A60-500 | Cast | 6 | 1–4 | 50 | 2.4 | O.K. |
| 10 | A60-500 | Cast | 6 | 1–4 | 33 | 1.9 | O.K. |
| 11 | A60-500 | Cast | 6 | 1–4 | 30 | 1.7 | O.K. |
| 12 | AMOCO 650F4 | Cast | 6 | 48 | 300 | 10.3 | Very grainy |
| 13 | AMOCO 650F4 | Cast | 6 | 48 | 150 | ND | Broke |
| 14 | AMOCO 650F4 | Cast | 6 | 48 | 75 | ND | Broke |
| 15 | AMOCO 650F4 | Cast | 6 | 48 | 50 | ND | Broke |

ND = Not Determined

EXAMPLE 3

This example is run to show the effect of nucleating agents on the spherulite size of a microporous film forming resin. The AMOCO 650F4 resin employed in Example 1 run 11 is found to yield large spherulites when melted on a hot stage microscope slide and allowed to cool slowly at room temperature as evidenced by FIG. 1. The AMOCO 650F4 resin has a good permeability potential if used to prepare a precursor film which can be successfully "solvent stretched" in that its melt index, density, and molecular weight distribution ratio are within the limits described herein as illustrated by Example 1 run 11. However, this resin has a slow crystallization rate which gives rise to the formation of large spherulites which prevent the resins permeability potential to be realized and render it difficult to resist tearing or splitting when stretched as illustrated by the results of Example 2. To reduce the spherulite size a polyethylene resin identified as G60-42-25, supplied from Soltex Polymer Corp. and having a molecular weight distribution ratio of 4.7, melt index of 0.42, and a density of 0.960 gm/cc is incorporated into the AMOCO resin in an amount of about 10% by weight thereof. The resin and additive are then melted on a hot stage microscope slide and allowed to cool. A photomicrograph is then taken using polarized light and displayed in FIG. 2. Photomicrographs are also taken of slides prepared in a similar manner utilizing the neat Soltex resin A60-500 as well as the G60-42-25 polyethylene above and depicted in FIGS. 3 and 4, respectively. As may be seen therefrom the spherulite size shown in FIG. 2 (i.e., resin and nucleating agent) is less than 10μ and similar to that of the preferred Soltex resin of FIG. 3. Consequently, when this nucleated Amoco 650F4 polymer is used to prepare a precursor film which is stretched, the precursor film will have a greater resistance to splitting. The power of magnification at which the photomicrographs of FIGS. 1 to 4 are taken as well as the visual observations are shown at Table III.

EXAMPLE 4

Figure 9:
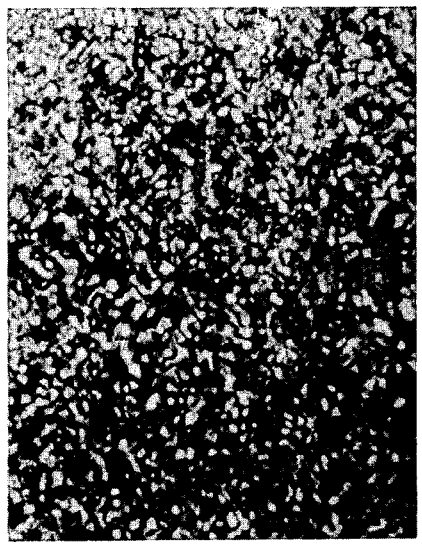
Figure 10:

A precursor film (2.8 mil) is prepared by the cast film method (slit die extrusion) from the AMOCO 650F4 resin employed in example 1 run 11 but having incorporated therein $SiO_2$ as the nucleating agent in amounts of 3.5%, 0.05%, and 0.02%. The results are depicted in FIGS. 5, 7, and 9 only with corresponding neat control films depicted in FIGS. 6, 8, and 10 which are prepared under the same extrusion conditions.

The results of Example 4 are summarized in Table III at runs 1 to 6. As may be seen therefrom the nucleating agent reduces the spherulite size in the microporous film and consequently will provide precursor films in which they are employed with improved permeability potential as illustrated by the results of Example 2.

TABLE III

| Example Number | Run No. | Resin | Figure No. | Nucleating Agent | Percent of nucleating agent (by weight) | Power of magnification | Visual Observation of spherulite size |
|---|---|---|---|---|---|---|---|
| 3 | 1 | AMOCO 650F4 | 1 | None | 0 | 250X | Large spherulite size |
|   | 2 | AMOCO 650F4 | 2 | G60-42 | 10% | 250X | Small spherulite size |
|   | 3 | SOLTEX A60-500 | 3 | None | 0 | 250X | Small spherulite size |
|   | 4 | G60-42 (control) | 4 | None | 0 | 250X | Small spherulite size |
| 4 | 1 | AMOCO 650F4 | 5 | G60-42 | 3.5% | 750X | Large spherulite size |
|   | 2 | AMOCO 650F4 (control) | 6 | None | 0 | 750X | Large shperulite size |
|   | 3 | AMOCO 650F4 | 7 | $SiO_2$ | 0.05% | 750X | Small spherulite size |
|   | 4 | AMOCO 650F4 (control) | 8 | None | 0 | 750X | Large spherulite size |
|   | 5 | AMOCO 650F4 | 9 | $SiO_2$ | 0.2% | 750X | Small spherulite size |
|   | 6 | AMOCO 650F4 (control) | 10 | None | 0 | 750X | Large spherulite size |

Large spherulite size = greater than 10μ
Small spherulite size = less than 10μ

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. In a "solvent stretch" process for preparing an open-celled microporous polymeric film from a non-porous polymeric precursor film comprising a crystalline polymer having both an amorphous and a crystalline component, the improvement which comprises utilizing an olefinic homopolymer having (1) a molecular weight distribution ratio of about 3.8 to about 13, (2) optionally a nucleating agent incorporated therein in an amount of from about 0.01 to about 10% by weight of the polymer, and (3) a melt index of about 3 to about 20 when a nucleating agent is not employed, and from about 0.3 to about 20 when a nucleating agent is employed, to provide a precursor film having a spherulite size and orientation sufficient to provide a microporous film therefrom having an improved morphological structure.

2. The process of claim 1 wherein the crystalline polymer had incorporated therein a nucleating agent in an amount of from about 0.01 to about 1.0% by weight of the polymer.

3. The process of claim 2 wherein the nucleating agents are selected from the group consisting of silica, salts of monocarboxylic acids, salts of dicarboxylic acids, collodial polytetrafluoroethylene and mixtures thereof.

4. The process of claim 1 wherein the olefinic homopolymer is polyethylene, the melt index of said olefinic homopolymer is about 3 to about 15 and the olefinic homopolymer has a molecular weight distribution ratio of about 6 to about 12.

5. The process of claim 2 wherein the melt index of said olefinic homopolymer is about 3 to about 8 and wherein the olefinic homopolymer has a molecular weight distribution ratio of about 8 to about 12.

6. In a "solvent stretch" process for preparing an open-celled microporous polymer film from a non-porous polymeric precursor film comprising a crystalline polymer having both an amorphous and a crystalline component the improvement which comprises utilizing a polyethylene homopolymer having (1) a density of from about 0.960 to about 0.965 gm/cc, (2) a molecular weight distribution ratio of about 4 to about 12, (3) optionally a nucleating agent incorporated therein in an amount of from about 0.01 to about 10% by weight of the polymer, and (4) a melt index of about 3 to about 20 when a nucleating agent is not employed, and from about 0.3 to about 20 when a nucleating agent is empolyed, to provide a precursor film having a spherulite size and orientation sufficient to provide a microporous film therefrom having an improved morphological structure.

7. The process of claim 6 wherein the crystalline polymer has incorporated therein a nucleating agent in an amount of from about 0.01 to about 1.0% weight of the polymer and wherein the nucleating agent is selected from the group consisting of silica, salts of monocarboxylic acids, salts of dicarboxylic acids, colloidal polytetrafluoroethylene and mixtures thereof.

8. The process of claim 6 wherein the melt index is about 3 to about 15 and the molecular weight distribution ratio is about 8 to about 12.

9. In a "solvent stretch" process for preparing an open-called microporous polymeric film from a non-porous polymeric precursor film said precursor film being composed of a crystalline polymer having both an amorphous and a crystalline component the improvement which comprises incorporating a nucleating agent into a crystalline olefinic homopolymer in an amount sufficient to reduce the spherulite size of a precursor film prepared therefrom.

10. The process of claim 9 wherein the nucleating agent is selected from at least one member of the group consisting of silica, diatomaceous earth, titanium dioxide, clays, salts of monocarboxylic acids, salts of dicarboxylic acids, collodial polytetrafluoroethylene, and polyethylene having a melt index of about 0.1 to about 3 and a molecular weight distribution ratio of from about 1 to about 3.5.

11. The process of claim 9 wherein the crystalline olefinic homopolymer is polyethylene having a density of from about 0.960 to about 0.965 gm/cc.

12. The process of claim 9 wherein the nucleating agent is present in amounts of about 0.1 to about 0.5% by weight.

13. In a "solvent stretch" process for preparing an open-celled microporous polymeric film from a non-porous polymeric precursor film comprising a cyrstalline polymer having both an amorphous and a crystalline component the improvement which comprises utilizing an olefinic homopolymer having (1) a molecular weight distribution ratio of about 4 to about 12, (2) a nucleating agent incorporated therein in an amount of from about 0.01 to about 10% by weight of the polymer and (3) a melt index of about 0.3 to about 20, to provide a precursor film having a spherulite size and orientation sufficient to provide a microporous film provided therefrom having an improved morphological structure.

14. The process of claim 13 wherein the olefinic homopolymer is polyethylene having a density of from about 0.960 to about 0.965 gm/cc.

15. The process of claim 13 wherein the nucleating agent is selected from the group consisting of silica, diatomaceous earth, titanium dioxide, clays, salts of monocarboxylic acids, salts of dicarboxylic acids, colloidal polytetrafluoroethylene, and polyethylene having a melt index of about 0.1 to about 3 and a molecular weight distribution ratio of from about 1 to about 3.5.

16. The process of claim 13 wherein the crystalline olefinic homopolymer is polyethylene having a density of about 0.962 to about 0.965 gm/cc.

17. The process of claim 13 wherein the nucleating agent is present in amounts of about 0.01 to about 0.5% by weight, the molecular weight distribution ratio is about 8 to about 12, and the melt index of said olefinic homopolymer is about 3 to about 15.

18. The process of claim 13 wherein the melt index is about 3 to about 8.

19. A process for preparing an open-celled microporous film comprising:
(a) contacting a non-porous precursor film having both an amorphous component and a crystalline component provided from an olefinic homopolymer having (1) a molecular weight distribution ratio of about 3.8 to about 13, (2) optionally a nucleating agent incorporated therein in an amount of from about 0.1 to about 10% by weight of the polymer, and (3) a melt index of about 3 to about 20 when a nucleating agent is not employed, and from about 0.3 to about 20 when a nucleating agent is employed;
(b) contacting said non-porous precursor film with a swelling agent comprising a non-aqueous solvent having a Hildebrand solubility parameter at or near that of the precursor film, for a time sufficient to permit absorption of the swelling agent into the film;

(c) uniaxially stretching said precursor film while in contact with the swelling agent; and (d) removing said swelling agent while maintaining said film in its stretched state.

* * * * *